United States Patent
Stanis et al.

(10) Patent No.: US 9,515,340 B1
(45) Date of Patent: Dec. 6, 2016

(54) CONDUCTIVE POLYMER LAYERS TO LIMIT TRANSFER OF FUEL REACTANTS TO CATALYSTS OF FUEL CELLS TO REDUCE REACTANT CROSSOVER

(75) Inventors: Ronald J. Stanis, Des Plaines, IL (US); Timothy N. Lambert, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1348 days.

(21) Appl. No.: 13/081,381

(22) Filed: Apr. 6, 2011

(51) Int. Cl.
*H01M 8/04* (2016.01)
*H01M 8/08* (2016.01)
*H01M 8/10* (2016.01)

(52) U.S. Cl.
CPC ............ *H01M 8/08* (2013.01); *H01M 8/1011* (2013.01)

(58) Field of Classification Search
CPC .................................................. H01M 8/1011
USPC ........................................ 429/443, 506, 514
See application file for complete search history.

(56) References Cited

U.S. PATENT DOCUMENTS

| 7,767,324 | B2 | 8/2010 | Fan | |
| 2010/0196800 | A1* | 8/2010 | Markoski et al. | ............ 429/523 |

OTHER PUBLICATIONS

Macediarmid, A.G., The concept of 'doping' of conducting polymers: the role of reduction potentials, Phil. Trans. R. Soc. Lond. A 314. 3-15. (1985)

K.D. Kreuer, "On the development of proton conducting polymer membranes for hydrogen and methanol fuel cells", Journal of Membrane Science 185 (2001), pp. 29-39.
M.P. Hogarth et al., "Direct Methanol Fuel Cells", Platinum Metals Review, 1996, 40, (4), pp. 150-159.
A.S. Arico et al., "DMFCs: From Fundamental Aspects to Technology Development", Fuel Cells 2001, 1, No. 2, 29 pgs.
L. Jorissen et al., "New membranes for direct methanol fuel cells", Journal of Power Sources 105 (2002), pp. 267-273.
V. Neburchilov et al., "A review of polymer electrolyte membranes for direct methanol fuel cells", Journal of Power Sources 169 (2007), pp. 221-238.
V.S. Silva et al., "Proton exchange membranes for direct methanol fuel cells: Properties critical study concerning methanol crossover and proton conductivity", Journal of Membrane Science 276 (2006), pp. 126-134.
L. Gubler et al., "A Polybenzimidazole-Based Membrane for the Direct Methanol Fuel Cell", Journal of the Electrochemical Society, 154 (9), 2007, pp. B981-B987.
N. Deluca et al., "Polymer Electrolyte Membranes for the Direct Methanol Fuel Cell: A Review", Journal of Polymer Science: Part B: Polymer Physics, vol. 44, (2006), pp. 2201-2225.

(Continued)

*Primary Examiner* — Gary Harris
(74) *Attorney, Agent, or Firm* — Daniel J. Jenkins

(57) ABSTRACT

An apparatus of an aspect includes a fuel cell catalyst layer. The fuel cell catalyst layer is operable to catalyze a reaction involving a fuel reactant. A fuel cell gas diffusion layer is coupled with the fuel cell catalyst layer. The fuel cell gas diffusion layer includes a porous electrically conductive material. The porous electrically conductive material is operable to allow the fuel reactant to transfer through the fuel cell gas diffusion layer to reach the fuel cell catalyst layer. The porous electrically conductive material is also operable to conduct electrons associated with the reaction through the fuel cell gas diffusion layer. An electrically conductive polymer material is coupled with the fuel cell gas diffusion layer. The electrically conductive polymer material is operable to limit transfer of the fuel reactant to the fuel cell catalyst layer.

21 Claims, 5 Drawing Sheets

(56) References Cited

OTHER PUBLICATIONS

D. Yamamoto et al., "Synthesis and Characterization of Composite Membrane with Three-Dimensionally Ordered Macroporous Polyimide Matrix for DMFC", Journal of the Electrochemical Society, 155 (3), 2008, pp. B303-B308.
J.-T. Wang et al., "A direct methanol fuel cell using acid-doped polybenzimidazole as polymer electrolyte", Journal of Applied Electrochemistry 26 (1996), pp. 751-756.
R. Wycisk et al., "Sulfonated Polyphosphazene-Polybenzimidazole Membranes for DMFCs" Journal of the Electrochemical Scolety, 152 (5), 2005, pp. A892-A898.
M. A. Hickner et al., "Transport in sulfonated poly (phenylene)s: Proton conductivity, permeability,l and the state of water", Polymer 47 (2006), pp. 4238-4244
L. Groenendaal et al., "Poly(3,4-ethylenedioxythiophene) and its derivatives: Past, Present, and Future", Advanced Materials, 2000, 12, No. 7, pp. 481-494.
L. Li et al., "Chemical modification of Nafion membrane with 3, 4-ethyleneclioxythlophene for direct methanol fuel cell application", Journal of Power Sources 175 (2008) pp. 256-260.
L. Li et al., "Formation and characterization of PEDOT-modified Nafion 117 membranes", J. Solid State Elecrtochem 2006) 10, pp. 708-713.
L.Li et al., "Poly(3,4-ethylenedioxythiophene)-Modified Nafion Membrane for Direct Methanol Fuel Cells", Russian Journal of Electrochemistry, 2006, vol. 42, No. 11, pp, 1193-1201.

M. Lefebvre et al., "Electronically Conducting Proton Exchange Polymers as Catalyst Supports for Proton Exchange Membrane Fuel Cells", Journal of the Electrochemical Society, 146 (6), 1999, pp. 2054-2058.
C. Arbizzani et al., "Passive DMFCs with PtRu catalyst on poly(3,4-ethylenedioxythlophene)-polystyrene-4-sulphonate support", Journal of Power Sources 180 (2008) pp. 41-45.
J.-F. Drillet et al., "Activity and long-term stability of PEDOT as Pt catalyst support for the DMFC anode", J. Appl. Electrochem (2007) 37, pp. 1219-1226.
R. J. Stanis et al., "Evaluation of hydrogen and methanol fuel cell performance of sulfonated diels alder poly (phenylene) membranes" Journal of Power Sources 195 (2010), pp. 104-110.
D. Chu et al., Effect of operating conditions on energy efficiency for a small passive direct methanol fuel cell, Electrochimica Acta 51 (2006), pp. 5829-5835.
V.S. Silva et al., "Performance and efficiency of a DMFC using non-fluorinated composite membranes operating at low/medium temperatures", Journal of Power Sources 145 (2005), pp. 485-494.
R. Stanis et al., "Poly(3,4-ethylenedioxythiphene) (PEDOT)—Modified Anodes: Reduced Methanol Crossover in Direct Methanol Fuel Cells", Energy Fuels 2010, 24, pp. 3125-3129.
"Conducting Polymers", http://www.fibrontech.com/conducting-polymers.html, printed from the internet Apr. 1, 2011, 2 pgs.
"The Concept of "Doping" of Conducting Polymers: The Role of Reduction Potentials", http://adsabs.harvard.edu/abs/1985RSPTA. 314 . . . 3M, printed from the internet Mar. 31, 2011, 2 pgs.

* cited by examiner

US 9,515,340 B1

CONDUCTIVE POLYMER LAYERS TO LIMIT TRANSFER OF FUEL REACTANTS TO CATALYSTS OF FUEL CELLS TO REDUCE REACTANT CROSSOVER

STATEMENT OF GOVERNMENT RIGHTS

This invention was developed under Contract DE-AC04-94AL85000 between Sandia Corporation and the U.S. Department of Energy. The U.S. Government has certain rights in this invention.

BACKGROUND

Field

Embodiments relate to the field of fuel cells. In particular, embodiments relate to conductive polymer layers to limit transfer of fuel reactants to catalysts in fuel cells.

Background Information

Fuel cells are electrochemical cells that convert chemical energy from a fuel reactant into electricity. Examples of fuel reactants include hydrogen, alkanols, alkanes, and other hydrocarbons. Fuel cells are different from conventional batteries in that fuel cells are open systems. Reactants including the fuel are introduced into the fuel cell, and reaction products, as well as any unused reactants, are removed from the fuel cell. In contrast, conventional batteries have a finite amount of stored energy. Once this finite amount of energy has been used up, the battery either needs to be discarded or recharged (e.g., plugged into an outlet). However, fuel cells can be replenished with additional reactant, which allows the fuel cells to achieve continuous operation for long run times. For these and other reasons, fuel cells are increasingly being considered for use in powering different types of electronic devices and systems.

FIG. 1 is a block diagram illustrating a simplified direct methanol fuel cell (DMFC) 100 and showing methanol ($CH_3OH$) crossover. DMFCs are a known type of fuel cell where methanol ($CH_3OH$) is used as the fuel. The DMFC includes anode 102, cathode 106, and polymer electrolyte membrane (PEM) 104. The PEM is coupled between the anode and the cathode. In DMFCs, the PEM is sometimes referred to as a proton exchange membrane.

During operation, half-reactions take place at each of anode 102 and cathode 106. The anode and cathode each typically include a catalyst to catalyze or accelerate the half-reactions. Methanol ($CH_3OH$) and water ($H_2O$) are introduced into the anode as reactants. A first half-reaction takes place at the anode, in which a molecule of methanol ($CH_3OH$) reacts with a molecule of water ($H_2O$) to produce a molecule of carbon dioxide ($CO_2$), six protons ($6H^+$), and six electrons ($6e^-$) as products. The protons ($H^+$) are transferred or exchanged across PEM 104 from the anode to the cathode as shown by the leftmost arrow in the PEM. Water ($H_2O$) is also transferred or exchanged into the PEM to keep the PEM hydrated to enhance operation (e.g., proton transport), as shown by the middle arrow in the PEM. The electrons ($e^-$) are conducted as electricity along a conductive path 108 from the anode to the cathode through an intervening external load 110 (e.g., a circuit, electronic device, etc.). Oxygen ($O_2$) or a source of oxygen (e.g., air) is introduced into the cathode as a reactant. A second half-reaction takes place at the cathode, in which stoichiometrically 1.5 molecules of oxygen ($O_2$) react with the six generated protons ($6H^+$) and the six generated electrons ($6e^-$) to produce three molecules of water ($3H_2O$) as a reaction product.

One significant challenge faced in fuel cells in general, and in DMFCs in particular, is reactant crossover (e.g., methanol crossover). As shown by the rightmost arrow within the PEM, in methanol crossover, some of the methanol that is introduced into anode 102 as reactant is transferred, without reacting, from the anode to cathode 106 across PEM 104. In other words, un-reacted methanol crosses over from the anode to the cathode across the PEM. In DMFCs, the PEM is generally designed to allow some water ($H_2O$) permeability or uptake in order to promote hydration of the PEM and provide good proton ($H^+$) transport. However, methanol and water are relatively similar in size and hydrophilicity (i.e., affinity for water), and consequently the PEM is generally not sufficiently selective to allow the desired amount of water uptake without allowing methanol crossover.

Methanol crossover may lead to various potential problems. For one thing, the crossover methanol may poison the cathode catalyst, which is commonly platinum or a platinum containing material. As a result, greater amounts of the cathode catalyst are commonly deployed in order to provide allowance for the poisoning. However, this tends to increase the cost of manufacturing the fuel cell. For another thing, methanol crossover tends to decrease the operating voltage of the fuel cell and decrease the resulting power output of the fuel cell. The crossover methanol, after reaching the cathode catalyst, may react quickly with oxygen (i.e., oxidize) on the cathode catalyst, which may reduce the operating voltage of the fuel cell. These or other known problems may be expected when other types of reactants besides methanol, such as, for example, other alkanols, alkanes, or other hydrocarbons, unintentionally or undesirably crossover PEM 104 from one side to the other.

Accordingly, reducing reactant crossover in fuel cells may offer certain advantages.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

Disclosed herein are embodiments of conductive polymer layers representing mass transfer limiting layers that are operable to limit transfer of a fuel reactant to a catalyst of a fuel cell. These conductive polymer layers may help to reduce reactant crossover in fuel cells. Also disclosed are embodiments of gas diffusion layers having one or more conductive polymer layers. Further disclosed are embodiments of membrane electrode assemblies and/or fuel cells incorporating one or more conductive polymer layers.

In the following description, numerous specific details, such as, for example, particular types and configurations of fuel cells, particular types of materials, specific examples of mass transfer limiting layers, specific methods of forming the mass transfer limiting layers, and the like, are set forth. However, it is understood that embodiments of the invention may be practiced without these specific details. In other instances, well-known components, structures, and techniques have not been shown in detail in order not to obscure the understanding of this description.

Figure 1:
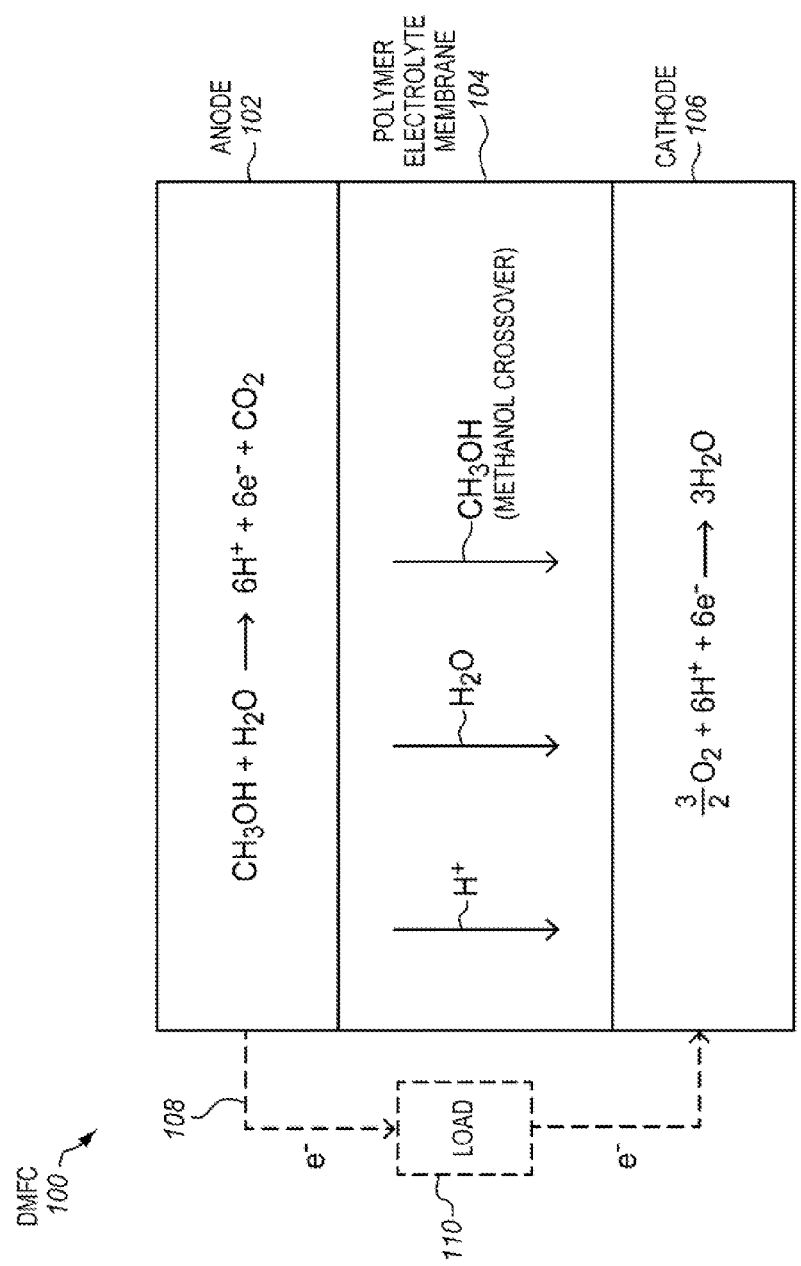
FIG. 1 is a block diagram illustrating a simplified direct methanol fuel cell (DMFC) and showing methanol ($CH_3OH$) crossover.
Figure 2:
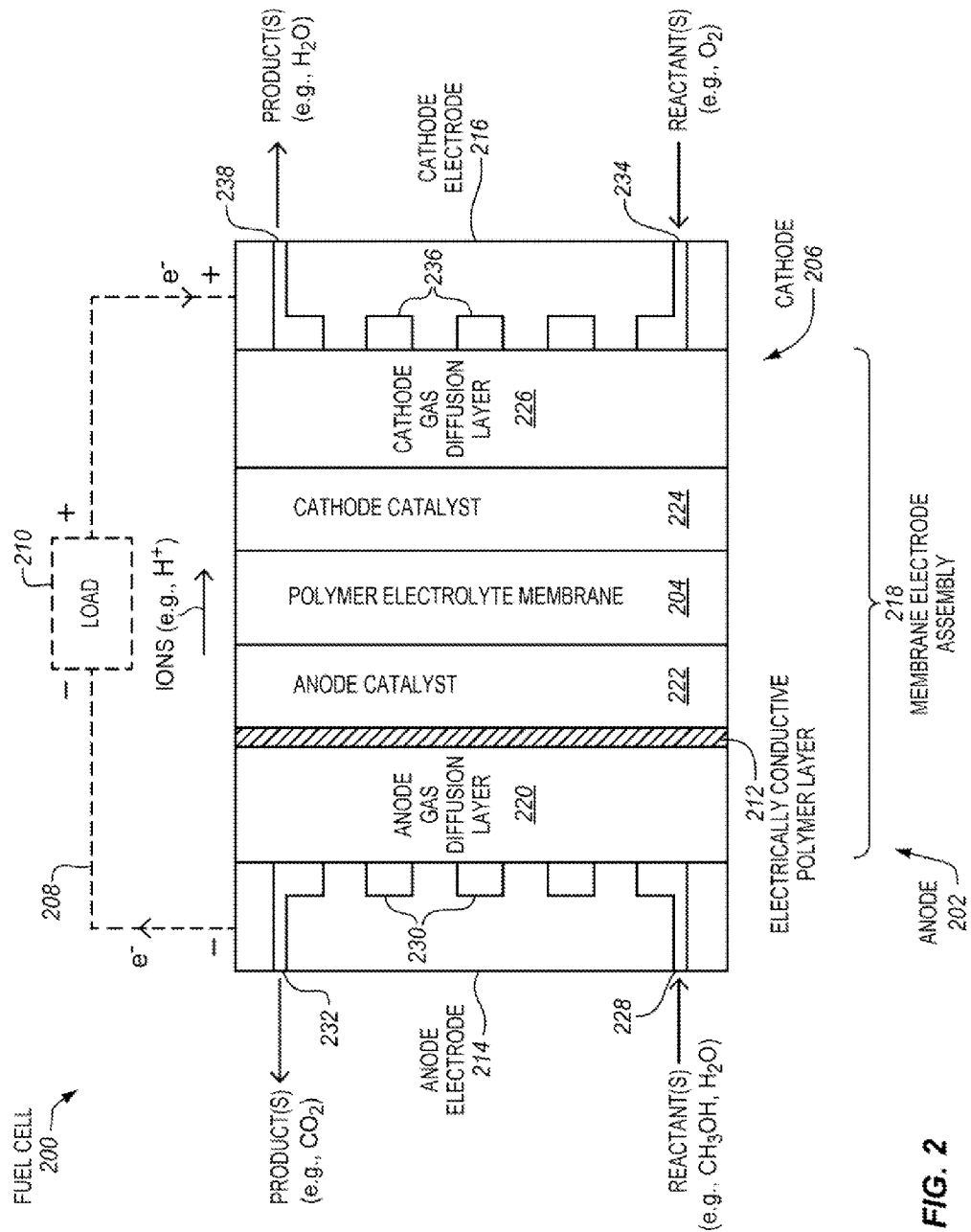
FIG. 2 is a block diagram of an example embodiment of a fuel cell having an example embodiment of a conductive polymer layer to limit transfer of a fuel reactant to a catalyst of the fuel cell.

FIG. 2 is a block diagram of an example embodiment of fuel cell 200 having an example embodiment of electrically conductive polymer layer 212. In various embodiments, the fuel cell may use as a fuel an alkanol (e.g., methanol, ethanol, propanol, butanol, or other straight or branched low alkanols (having from about one to six carbons) or lower alkanols (having from about one to ten carbons)), an alkane (e.g., methane, ethane, propane, butane, or other straight or branched low alkanes (having from about one to six carbons) or lower alkanes (having from about one to ten carbons)), or other hydrocarbons or carbonaceous materials, or combinations thereof.

The fuel cell includes anode 202 and cathode 206. The anode includes anode electrode 214 and the cathode includes cathode electrode 216. Coupled between anode electrode 214 and cathode electrode 216 is a membrane electrode assembly (MEA) 218. MEA 218 includes a stack of bonded, merged, attached, connected, or otherwise coupled layers. The illustrated embodiment of MEA 218 includes, from left-to-right (as viewed), anode gas diffusion layer (GDL) 220, conductive polymer layer 212, anode catalyst layer 222, polymer electrolyte membrane (PEM) 204, cathode catalyst 224, and cathode GDL 226. It is to be appreciated that, although the MEA is shown to be flat in the illustration, that it may optionally be non-flat (e.g., rolled into a cylinder or spiral), and moreover the fuel cell may optionally include more than one MEA stack.

Anode GDL 220 and conductive polymer layer 212 are disposed and coupled between anode electrode 214 and anode catalyst layer 222. In the illustrated example embodiment (a viewed), a leftmost major surface of anode GDL 220 abuts and is adjacent to anode electrode 214, a rightmost major surface of anode. GDL 220 abuts and is adjacent to a leftmost major surface of conductive polymer layer 212, and a rightmost major surface of conductive polymer layer 212 abuts and is adjacent to a leftmost major surface of anode catalyst layer 222, although the scope of the invention is not limited to only this position of conductive polymer layer 212. As will be explained further below, conductive polymer layer 212 may additionally or alternatively be disposed or coupled at one or more other positions between anode electrode 214 and anode catalyst layer 222. In the illustrated embodiment (a viewed), a rightmost major surface of anode catalyst 222 abuts and is adjacent to a leftmost major anode-side surface of PEM 204 facing anode electrode 214. A leftmost major surface of cathode catalyst 224 abuts and is adjacent to a second, opposite, rightmost major cathode-side surface of PEM 204 facing cathode electrode 216. Cathode GDL 226 is disposed and coupled immediately between cathode catalyst 224 and cathode electrode 216. Terms such as "rightmost", "leftmost", "upper", "lower", "above", "below", and the like, are used herein to facilitate description of the illustrated fuel cell. It will be evident that the fuel cell may be used in a variety of orientations.

Anode electrode 214 has anode input 228 to receive one or more reactants. The anode input may include an input port, opening, valved opening, pipe, tube, conduit, flow channel, etc. During operation, the one or more reactants may be introduced through the anode input and conveyed through one or more anode flow channels 230, which may be defined within anode electrode. The one or more reactants may diffuse across or otherwise cross anode gas diffusion layer (GDL) 220. In the case of liquid reactants, they often vaporize and cross the anode GDL as vapors. The one or more vaporized reactants may also diffuse across, permeate across, or otherwise transfer across conductive polymer layer 212. The one or more reactants may react at anode catalyst 222 according to a first half-reaction. The anode catalyst is operable to accelerate the first half-reaction. The first half-reaction may generate electrons ($e^-$) and ions. In some embodiments, the ions that are generated are protons ($H^+$). In other embodiments (e.g., in alkaline fuel cells) the ions that are generated may be hydroxyl ions ($OH^-$). The generated protons ($H^+$), hydroxyl ions ($OH^-$), or other ions are transferred or exchanged across PEM 204. In protons transfer in the direction shown in the illustration from the anode to the cathode across the PEM, whereas in an alkaline fuel cell the hydroxyl ions ($OH^-$) may transfer across the PEM from the cathode to the anode. Water ($H_2O$) may also be transferred into the PEM (e.g., from the anode side) to keep the PEM hydrated to enhance operation.

The generated electrons ($e^-$) are electrically conducted from anode catalyst 222, where they are generated, back through conductive polymer layer 212 and anode GDL 220 to anode electrode 214. In some embodiments, the conductive polymer layer 212, anode GDL, and anode electrode may all be sufficiently electrically conductive to conduct the electrons. The electrons are provided to a conductive path 208 (e.g., one or more wires) electrically coupled with the anode electrode, which is used to conduct the electrons as electricity from anode electrode 214 to cathode electrode 216 through an intervening external load 210 (e.g., a circuit, electronic device, electronic system, electrical resistance, electronic component, etc.). The conductive path and external load are shown in dashed lines to indicate that they are not a part of fuel cell 200. Reaction products of the first half-reaction may cross back from anode catalyst 222 through conductive polymer layer 212 and anode GDL 220 and may be removed through anode output 232. In the case of carbon-containing reactants, the reaction product commonly includes carbon dioxide ($CO_2$). Any un-reacted reactant may also be removed through the anode output.

Cathode electrode 216 has cathode input 234 to receive one or more additional reactants. During operation, the one or more reactants may be introduced through the cathode input and conveyed through one or more cathode flow channels 236, which be defined within the cathode electrode. The one or more reactants may diffuse across or otherwise cross cathode GDL 226. The one or more reactants may react at cathode catalyst 224 according to a second half-reaction. The cathode catalyst is operable to accelerate the second half-reaction. Commonly, the second half-reaction may consume the electrons ($e^-$) generated in the first half-reaction at anode catalyst 222. The electrons ($e^-$) may be received at cathode electrode 216 and conducted across the cathode electrode, cathode GDL 226, and cathode catalyst 224 to participate in the second half-reaction. The cathode electrode, the cathode GDL, and the cathode catalyst may all be sufficiently electrically conductive to conduct the electrons. As shown in the illustration, in case of proton exchange fuel cells, the second half-reaction may consume the protons (H$^+$), which are generated in the first half-reaction at the anode catalyst, and transferred across the PEM from the anode to the cathode. Alternatively, in the case of an alkaline fuel cell, the second half-reaction may generate hydroxyl ions (OH$^-$), which may transfer across the PEM from the cathode to the anode, and be consumed in the first half-reaction at the anode catalyst. Reaction products of the second half-reaction may cross back from the cathode catalyst through cathode GDL and be removed through cathode output 238. Any un-reacted reactant may also be removed through the cathode output.

In the particular case of fuel cell 200 being a DMFC, operating as a proton exchange fuel cell, methanol (CH$_3$OH) and water (H$_2$O) may be introduced as reactants at anode input 228. A first half-reaction may take place at anode catalyst 222, in which a molecule of methanol (CH$_3$OH) reacts with a molecule of water (H$_2$O) to produce a molecule of carbon dioxide (CO$_2$), six protons (6H$^+$), and six electrons (6e$^-$) as products. Commonly, the anode catalyst may be a mixture of platinum and ruthenium particles. The protons (H$^+$) may be transferred across PEM 204 from the anode to the cathode. Reactant water (H$_2$O) may also transfer into the PEM to keep the PEM hydrated to enhance operation (e.g., proton transport). The electrons (e$^-$) generated at the anode catalyst may be conducted as electricity along conductive path 208 from anode electrode 214 to cathode electrode 216. The generated carbon dioxide (CO$_2$) may be removed through anode output 232. Oxygen (O$_2$) or a source of oxygen (e.g., air) may be introduced into cathode input 234 as a reactant. A second half-reaction may take place at the cathode catalyst, in which stoichiometrically 1.5 molecules of oxygen (O$_2$) react with the six generated protons (6H$^+$) and the six generated electrons (6e$^-$) to produce three molecules of water (3H$_2$O) as a reaction product that may be removed from cathode output 238. Commonly, the cathode catalyst may include platinum particles.

PEM 204 is an example of a membrane-based electrolyte. The PEM may be a semi-permeable membrane intended to conduct ions, for example protons (H$^+$) or hydroxyl ions (OH$^-$), while being relatively impermeable to other components, such as oxygen, carbon dioxide, etc. The PEM may help to separate anode-side reactants from cathode-side reactants, while transporting the ions. In some embodiments, the PEM is a proton exchange membrane operable to transfer or exchange protons from the anode to the cathode, whereas in other embodiments the polymer electrolyte membrane is an alkaline exchange membrane operable to transfer anions (e.g., OH$^-$) from the cathode to the anode. Commonly, the PEM is made from one or more ionomeric materials. A common ionomeric material used to manufacture PEMs is NAFION® brand perfluorosulphonic acid (PFSA) material. NAFION® brand PEMs include PFAS/polytetrafluoroethylene (PTFE) copolymers, and are commercially available from DuPont, of Wilmington, Del. Various other ionomer materials suitable for PEMs are known in the arts (e.g., those based on polyaromatic polymers and partially fluorinated polymers). In the case of alkaline exchange membranes, basic functional groups (e.g. amine compounds) or cationic groups (e.g., quaternary ammonium compounds) may be included to help transport anions (e.g., OH$^-$).

Anode GDL 220 is typically a porous layer or material. A few representative examples of different types of porous materials commonly used for anode GDL include, but are not limited to carbon cloths, carbon papers, carbon foams, graphite cloths, graphite papers, graphite foams. Other types of materials that may potentially be used for anode GDL include, but are not limited to, other porous carbon materials, other porous graphite materials, other electrically conducting cloths, papers, foams, and other electrically conducting porous materials. The carbon and graphite materials used for anode GDL are sufficiently electrically conductive to conduct electrons through the anode GDL. In some embodiments, the anode GDL may optionally incorporate a hydrophobic material (i.e., a material more hydrophobic than carbon, graphite, or another primary material of construction of the GDLs), to help prevent the GDLs from becoming saturated with liquid water and/or flooding. One commonly used example of such a hydrophobic material is polytetrafluoroethylene (PTFE), such as TEFLON® brand PTFE, available from DuPont Corporation, of Wilmington, Del. Other hydrophobic materials known in the arts may also optionally be used (e.g., other fluoropolymers or other water repellant materials).

Referring again to FIG. 2, the illustrated embodiment of fuel cell 200 includes conductive polymer layer 212. Conductive polymer layer 212 is disposed in the fuel cell between anode electrode 214 and anode catalyst 222. The illustration shows one possible location of conductive polymer layer 212, although other possible locations will be disclosed further below. In some embodiments, conductive polymer layer 212 may be operable to limit a rate of diffusion, flux, permeability, or other mass transfer of one or more anode-side reactant(s) to anode catalyst 222 and/or PEM 204. That is, the conductive polymer layer may be a mass transfer limiting layer. In the particular case of fuel cell 200 being a DMFC, conductive polymer layer 212 may be operable to limit a rate of mass transfer of methanol (CH$_3$OH) to the anode catalyst and/or the PEM. Similarly, for other alkanol, alkane, or hydrocarbon fuel cells, conductive polymer layer 212 may be operable to limit a rate of mass transfer of the corresponding alkanol, alkane, or hydrocarbon fuel to the anode catalyst and/or the PEM. Advantageously, limiting the rate of mass transfer of the one or more anode-side reactant(s) to the anode catalyst and/or the PEM may help to reduce reactant crossover of the one or more reactants across the PEM.

As previously mentioned, anode GDL 220 is typically a porous layer or material, and consequently provides quite limited resistance to the mass transfer of the reactant(s) to anode catalyst 222 and/or PEM 204. The anode GDL typically includes open gas-filled pores through which gases and vapors are able to diffuse by way of gas-phase diffusion. The reactant(s) may be able to diffuse relatively rapidly in the gas phase through these gas-filled pores. As a result, the rate of transfer of the reactant(s) to the anode catalyst may be relatively high and may initially exceed the rate of consumption of the reactant(s) at the anode catalyst, thereby allowing a concentration of the reactant(s) at anode catalyst and/or near PEM to increase in magnitude until an undesirably high equilibrium or steady state concentration is achieved. The rate of crossover of the reactant(s) across the PEM tends to be directly related to the magnitude of the reactant(s) concentration gradient across the PEM (i.e., the greater the concentration difference across the PEM, the greater the rate of crossover of the reactant(s) across the PEM). As a result, the higher the concentration of the reactant(s) in the anode catalyst and/or next to the leftmost anode-side major surface of the PEM (as viewed), the greater the rate of reactant crossover.

Conductive polymer layer 212 may be operable to limit the rate of diffusion, flux, permeability, or other mass transfer of the reactant(s) from flow channels 230 to anode catalyst 222 and/or PEM 204. In some embodiments, conductive polymer layer 212 may be less porous than anode GDL 220 and/or may close off some of the pores of anode GDL 220. For example, in some embodiments, conductive polymer layer 212 may be a substantially non-porous layer, meaning a layer having a porosity of less than 50% by volume. In some cases, the porosity may be less than 40%, less than 30%, less than 25%, less than 20%, or even less. As used herein, a non-porous layer has a porosity of less than 25%. In order to cross the substantially non-porous layer, the reactant(s) may need to diffuse, permeate, or transfer through a solid-phase. The rate of transfer of the reactant(s) through such a solid-phase is typically less than the rate of transfer of the reactant(s) through the gas-filled pores of the anode GDL (e.g., by way of gas-phase diffusion). Mass transfer through conductive polymer layer 212 may occur through permeability through a solid matrix. The permeability through the solid matrix may be limited by diffusion rate of the reactant(s) through the solid matrix (e.g., dependent upon a diffusion coefficient), solubility of the reactant(s) in the solid matrix (e.g., dependent upon a partitioning coefficient), or a combination of both diffusion rate through the solid matrix and solubility in the solid matrix. Alternatively, rather than using a non-porous layer or substantially non-porous layer, flux may also be reduced by increasing a thickness of a layer having a porosity that is either less than, the same as, or even greater than the porosity of the GDL. For example, the thickness of the conductive polymer layer 212 may be greater than a thickness of the GDL to help reduce the flux.

In various embodiments, one or more of a thickness of, permeability in, diffusion coefficient in, solubility in, or partition coefficient of conductive polymer layer 212, may be adjusted to customize or tailor the mass transfer rate of one or more reactants) to a particular level. Commonly, conductive polymer layer 212 may have a thickness ranging from about 0.001 cm to 0.05 cm, or from about 0.002 cm to 0.01 cm, although this is not required. In various embodiments, conductive polymer layer 212 may be operable to limit the transfer of the one or more fuel reactant(s) into the anode catalyst to a rate that is at least 5, 10, 15, 20, 25, 50, or more than 50 times less than a rate that the fuel reactant(s) are able to transfer, across the anode GDL. For example, in various embodiments, the ratio of the permeability through conductive polymer layer 212 to permeability through GDL 220 may range from about 1:1 to 1:100, or from about 1:5 to 1:50, or from about 1:5 to 1:25, or from about 1:10 to 1:25.

Conductive polymer layer 212 may be operable to reduce the rate of mass transfer of the reactant(s) from flow channels 230 to anode catalyst 222 and/or PEM 204 relative to the rate of consumption of the reactant(s) at the anode catalyst. In some embodiments, conductive polymer layer 212 may be operable to limit the rate of mass transfer of the reactant(s) to anode catalyst 222 so that the rate is equal to, substantially equal to, or not substantially greater than, a given, predetermined, or desired consumption rate of the reactant(s) at the anode catalyst. As used herein, the rates are equal if they are within 10% of one another, the rates are substantially equal if they are within 30% of one another, and the transfer rate is not substantially greater than the consumption rate if it is not more than 30% greater. By way of example, the given, predetermined, or desired consumption rate may be related to a design maximum, average, or desired consumption rate (e.g., to achieve a given output current or voltage). For example, if the fuel cell is designed/ intended to have a maximum current density of 400 mA/cm$^2$, then the mass transfer rate of the reactant(s) may be limited to a rate that is equal to, substantially equal to, or not substantially, greater than, a consumption rate corresponding to that maximum current density. As a result, the reactant(s) may transfer to the anode catalyst at a rate that is equal to, substantially equal to, not substantially greater than, or at least better matched to, the corresponding consumption rate of the reactant(s) at the anode catalyst. Consequently, there may be less accumulation of un-reacted reactant(s) at the anode catalyst and/or next to the anode-side major surface of the PEM (e.g., a reduced equilibrium, steady-state, or long-term concentration of the reactant(s)). As previously mentioned, reducing the concentration of the reactant(s) in the anode catalyst and/or next to the PEM may help to reduce the rate of crossover of the reactant(s) across the PEM.

Conductive polymer layer 212 may include one or more electrically conductive organic polymers that are operable to conduct electrons and/or electricity. The conductive organic polymers, may have electrical conductivities ranging from levels representative of semiconductors to levels representative of some metals. Examples of conductive organic polymers include, but are not limited to, thiophene polymers, polythiophenes, 3-alkyl thiophene polymers, 3,4-ethylenedioxythiophene polymers, poly(3,4-ethylenedioxythiophenes) (PEDOTs), benzothiazole polymers, benzothiadiazole polymers, phenylene sulfide polymers, poly(p-phenylene sulfides), pyrole polymers, polypyrroles, carbazole polymers, polycarbazoles, indole polymers, polyindoles, azepine polymers, polyazepines, analine polymers, polyanilines, acetylene polymers, polyacetylenes, fluorene polymers, polyfluorenes, phenylene polymers, polyphenylenes, pyrene polymers, polypyrenes, azuelene polymers, polyazulenes, naphthalene polymers, polynaphthalenes, phenylene vinylene polymers, poly(p-phenylene vinylenes), derivatives thereof (e.g., having different types of functional groups), other electrically conductive polymers known in the arts (e.g., other polymers having conjugated sequences of double bonds), and combinations thereof (e.g., heteropolymers, copolymers, layers of different polymers, etc.). The selected polymer should be sufficiently stable under the operating conditions for the particular fuel cell and preferably does not provide an undesirably high specific resistance increase. As used herein, the term polymer is not limited to any large number of monomers incorporated into the polymer. Rather, the term polymer is intended to encompass oligomers having, for example, seven or more monomers.

In some embodiments, the conductive polymers may include acidic functional groups, such as, for example, sulfur containing acid functional groups, phosphorous containing acid functional groups, sulfonic acid groups, phosphonic acid groups, carboxylic acid groups, other acidic functional groups, and combinations thereof. Including such acidic functional groups may facilitate proton (H$^+$) transport and/or solubility within conductive polymer layer 212. Sulfonates and/or phosphonates may also be used. In some embodiments, the conductive polymers may include basic functional groups, such as, for example, aliphatic or aromatic primary, secondary and/or tertiary amines, imidazoles, guanadinuiums, etc. Including such basic functional groups may facilitate anion (e.g., OH$^-$) transport and/or solubility within conductive polymer layer 212.

In some embodiments, conductive polymer layer 212 may optionally include one or more other materials besides inherently conductive organic polymers. For example, in some embodiments, the conductive polymer layer may optionally include one or more electrical conductivity enhancing or increasing additives or materials to enhance or increase conductivity of the conductive polymer layer. In some embodiments, the electrical conductivity enhancing additives or materials may be conductive materials that are more electrical conductivity than another material of the conductive polymer layer (e.g., the conductive organic polymer). Examples of conductive materials include, but are not limited to, carbon nanotubes (single walled and multi-walled), fullerenes, graphenes, graphene-based materials, other carbon particles, nanoparticles, or nanomaterials, metal particles, metal nanoparticles, other conductive particles, nanoparticles, or nanomaterials, and combinations thereof. Metal particles that do not catalyze undesired reactions involving the reactants of the fuel cell may be favored. Representatively, the conductive materials may be employed at levels ranging from about 1 to 5 wt %.

In other embodiments, the electrical conductivity enhancing additive or material may be one or more dopants, which may not themselves be conductive, but which may be operable to increase the conductivity of another material of the conductive polymer layer (e.g., the conductive organic polymer). In one aspect, the conductive polymer layers may be p-doped (e.g., oxidized), which may be useful for an anode. For p-doping, suitable chemical dopants include iodine, lithium perchlorate, anions (e.g., chloride, bromide, perchlorate, sulfate, etc.), anionic surfactants (e.g., sulfonate based surfactants and phosphate based surfactants). For some polymers (e.g. polyaniline or polypyrrole) the dopant may be a cation (e.g., protons or protonic dopants). Other dopants for increasing conductivity of conductive polymers are known in the arts.

Reducing reactant crossover of the reactant(s) across the PEM may offer certain advantages. One potential advantage is that a higher concentration of the reactant may be introduced into the fuel cell without increasing the total amount of reactant crossover. Traditionally, in DMFCs and other types of fuel cells, the concentration of the reactant was constrained by the need to limit reactant crossover. However, with the conductive polymer layer to reduce the reactant crossover, higher reactant concentrations may be employed. This may help to significantly increase the energy density of the system, decrease the volume of fuel for a given run time, and/or may tend to increase the maximum attainable current output. Another potential advantage of reducing the reactant crossover is reduced catalyst poisoning, which may allow reduced amounts of costly catalyst to be used. Yet another potential advantage is increased operating voltage and power output of the fuel cell due to decreased subtractive contributions of reactions undergone by crossover reactant at the cathode catalyst.

Additionally, conductive polymer layer 212 may allow the reactant crossover to be reduced without a need to modify the PEM. This may allow standard PEMs, which have been developed and improved over many years, to be utilized, without needing to tradeoff performance (e.g., reduced proton conductivity due to reduced water uptake) and/or durability of the PEM in exchange for reduced reactant crossover. Furthermore, conductive polymer layer 212 may allow the reactant crossover to be reduced without a need to include an additional material within the anode catalyst layer. Including an additional material within the anode catalyst layer may tend to bury, block, or conceal at least some of the catalyst, thereby making it less available to reactants.

FIG. 3A-3E are block diagrams of cross-sectional views illustrating different example embodiments of portions of membrane electrode assemblies (MEAs) 318 showing various different example embodiments of electrically conductive polymer layers 312 and suitable positions for the electrically conductive polymer layers 312 these figures, anode catalyst 322 and polymer electrolyte membrane (PEM) 304 are shown in dashed lines to indicate that some embodiments pertain to portions of MEAs having anode catalyst 322 and PEM 304, whereas other embodiments pertain to anode gas diffusion layer (GDL) 320 and one or more electrically conductive polymer layer(s) 312 without anode catalyst 322 and without PEM 304. Except where otherwise specified or apparent, the conductive polymer layer, the anode catalyst, anode GDL, and PEM may have characteristics similar to those of the correspondingly named components of FIG. 2. To avoid obscuring the description, these characteristics will not be repeated.

Figure 3A:
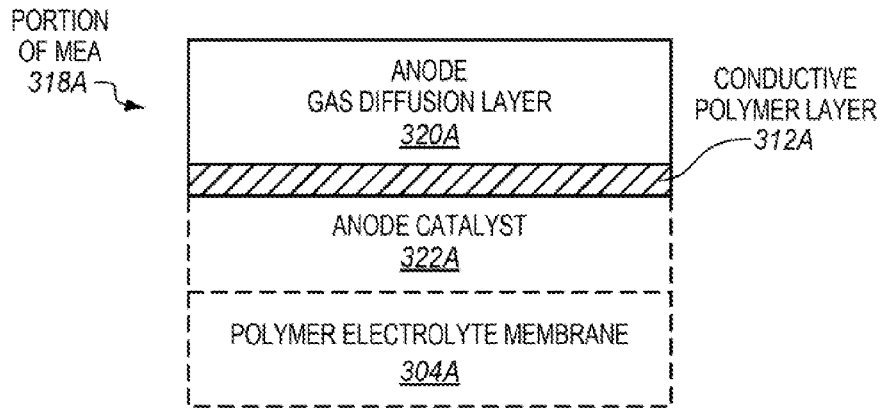
FIG. 3A-3E are block diagrams of cross-sectional views illustrating different example embodiments of portions of membrane electrode assemblies (MEAs) showing various different example embodiments of conductive polymer layers and suitable positions therefor.

FIG. 3A illustrates a first example embodiment of a portion of MEA 318A showing a first example embodiment of conductive polymer layer 312A at a first possible position. MEA 318A includes anode GDL 320A, conductive polymer layer 312A, anode catalyst 322A, and PEM 304A. In this first example embodiment, the anode GDL, the electrically conductive polymer layer, the anode catalyst, and the PEM have the same relative positions as the correspondingly named components in FIG. 2. Conductive polymer layer 312A is disposed and coupled immediately between major opposing surfaces of anode GDL 320A and anode catalyst 322A. As viewed, electrically conductive polymer, layer 312A is below anode GDL 320A and above anode catalyst 322A.

Figure 3B:
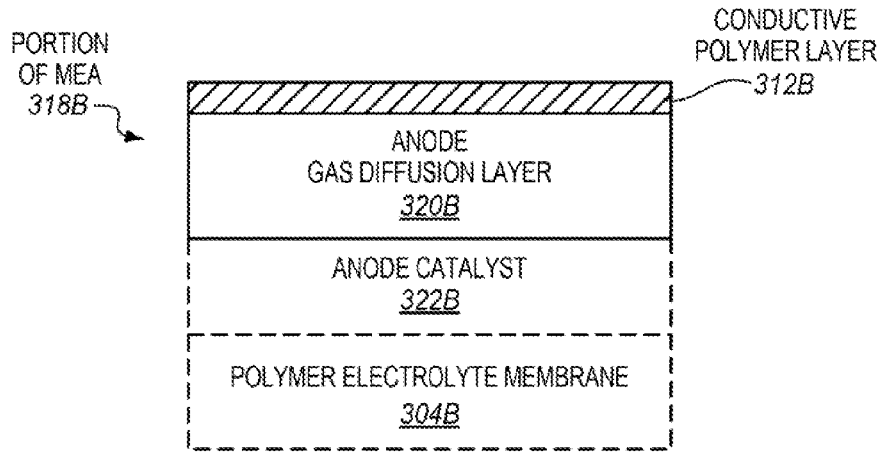

FIG. 3B illustrates a second example embodiment of a portion of MEA 318B showing a second example embodiment of conductive polymer layer 312B at a second possible position. MEA 318B includes anode GDL 320B, conductive polymer layer 312B, anode catalyst 322B, and PEM 304B. Electrically conductive polymer layer 312B is coupled to an opposite major surface or side of anode GM, 320B as anode catalyst 322B. Electrically conductive polymer layer 312B is farther from both anode catalyst 322B and PEM 304B than anode GDL 320B. In a fuel cell, electrically conductive polymer layer 312B would be closer to an anode electrode (e.g., anode electrode 214 in FIG. 2) than anode GDL 320B. As viewed, electrically conductive polymer layer 312B is above anode GDL 320A. FIGS. 3A and 3B illustrate that an conductive polymer layer may be on either side of an anode GDL.

Figure 3C:
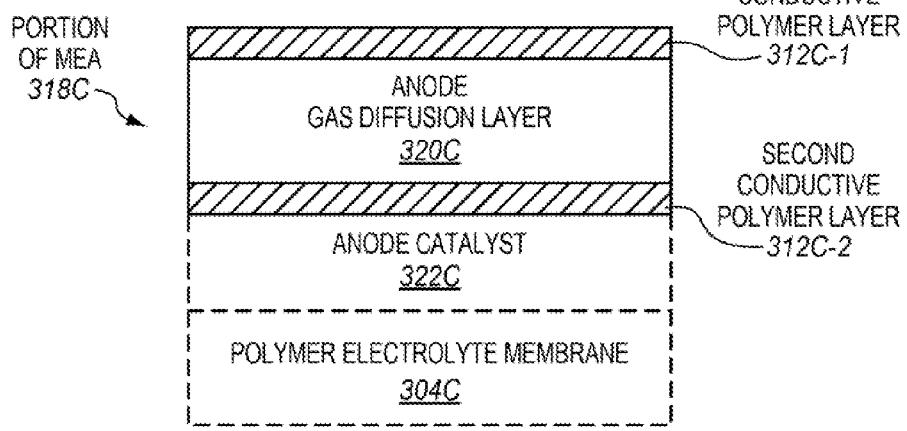

FIG. 3C illustrates a third example embodiment of a portion of MEA. 318C showing a third example embodiment of a first conductive polymer layer 312C-1 and a second conductive polymer layer 312C-2 and their positions. MEA 318C includes anode GDL 320C, first conductive polymer layer 312C-1, second conductive polymer layer 312C-2, anode catalyst 322C, and PEM 304C. First electrically conductive polymer layer 312C-1 has the same position as conductive polymer layer 312B in FIG. 3B. Second electrically conductive polymer layer 312C-2 has the same position as conductive polymer layer 312A in FIG. 3A. FIG. 3C illustrates that conductive polymer layers may be on both sides of an anode GDL. In one aspect, each of the first and second conductive polymer layers may have a lesser thickness than a single mass transfer limiting layer would have to limit mass transfer to the same extent. For example, a combined thickness of the first and second electrically conductive polymer layers may be approximately the same as the thickness of a single mass transfer limiting layer (e.g., layer 312A).

Figure 3D:
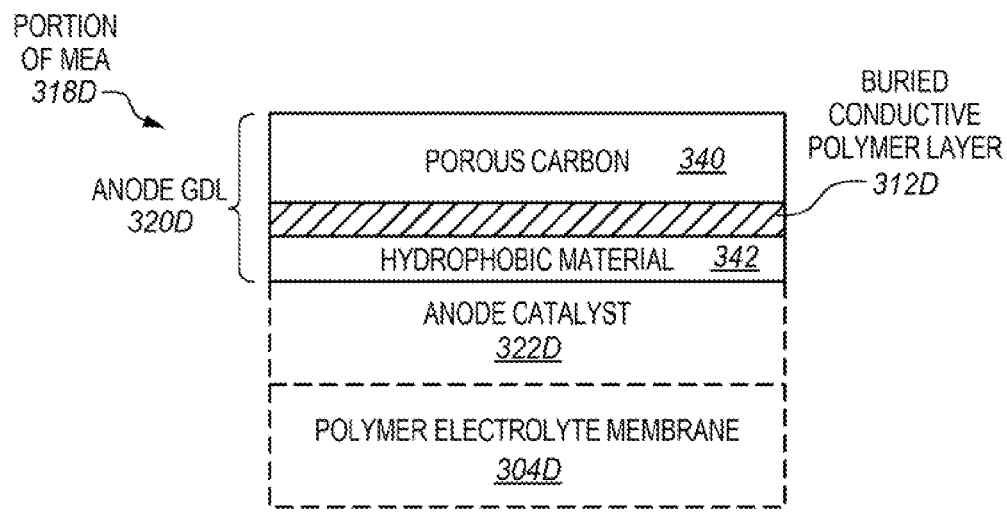

FIG. 3D illustrates a fourth example embodiment of a portion of MEA 318D showing a fourth example embodiment of a buried conductive polymer layer 312D. MEA 318D includes anode GDL 320D, anode catalyst 322D, and PEM 304D. Anode GDL 320D includes buried conductive polymer layer 312D which is buried within anode GDL 320D. In particular, the anode GDL includes porous carbon 340, hydrophobic material 342, and buried electrically conductive polymer layer 312D disposed immediately between porous carbon 340 and hydrophobic material 342. The porous carbon may be, or may be replaced by, any of the aforementioned electrically conductive materials used for anode GDLs. The hydrophobic material may be any of the hydrophobic materials discussed above for use in GDLs (e.g., polytetrafluoroethylene). This figure illustrates that a conductive polymer layer may be buried or integrated within an anode GDL.

Figure 3E:
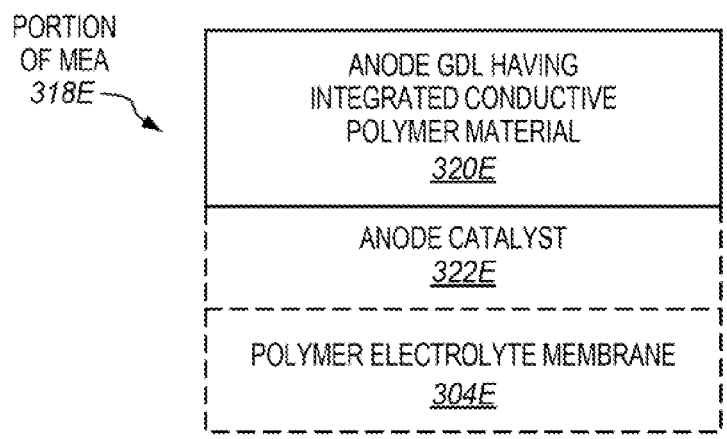

FIG. 3E illustrates a fifth example embodiment of a portion of MEA 318E showing a fifth example embodiment of anode GDL having integrated conductive polymer material 320E. MEA 318E includes anode GDL with integrated conductive polymer material 320E, anode catalyst 322E, and PEM 304E. In this example embodiment, the anode GDL integrates the conductive polymer material within its interior or bulk. The conductive polymer material is not formed as a discrete layer on an outside of the anode GDL, but rather the conductive polymer material integrated within or dispersed throughout a bulk of the anode GDL. In some embodiments, the conductive polymer material may coat or be layered on individual carbon fibers or carbon microstructures of the anode GDL. The anode GDL having integrated conductive polymer material 320E represents another example embodiment of a conductive polymer layer.

Different methods of forming conductive polymer layers, such as, for example, conductive polymer layer 212 and/or conductive polymer layer 312, are contemplated. Also, different methods of incorporating conductive polymer layers, such as, for example, conductive polymer layer 212 and/or conductive polymer layer 312 in an MEA are contemplated.

In some embodiments, the conductive polymer layers may be formed by polymerizing an electrically conductive organic polymer on one or more surfaces of an MEA (e.g., one or more surfaces of an anode GDL, a surface of an anode catalyst, etc.). In one example, the electrically conductive organic polymer may be formed by electropolymerization of monomer and/or oligomer directly onto one or more surfaces of an anode GDL. Example 1 below discloses further details of electropolymerization of 3,4-ethylenedioxythiophene (EDOT) monomer onto an anode GDL to form poly(3,4-ethylenedioxythiophene) (PEDOT). In another example, the electrically conductive organic polymer may be formed by chemical polymerization (non-electrochemical) of monomer and/or oligomer on one or more surfaces of an anode GDL. The monomers may be applied to the anode GDL by various techniques, such as, for example, depositing, injecting, dispensing, spraying, casting, dipping, spinning, spreading, or painting, and then the monomers may be polymerized through application of radiation, light, heat, introduction of an initiator chemical, etc. If conductive polymer is desired to be included within the internal bulk of the GDL, the GDL may be soaked in monomer and/or oligomer to at least partially fill the pores of the GDL, and then the monomer and/or oligomer may be polymerized.

In other embodiments, the conductive polymer layers may be formed by applying already formed electrically conductive organic polymer, along with other optional components (e.g., one or more conduction enhancers or conductive additives) to one or more surfaces of an MEA (e.g., one or more major surfaces of an anode GDL, a surface of an anode catalyst, etc.). For example, electrically conductive organic polymer, or a solution of electrically conductive organic polymer dissolved in a solvent, may be applied to the one or more surfaces. The polymer or polymer solution may be applied to the surface(s) by various techniques, such as for example, depositing, injecting, dispensing, spraying, casting, dipping, spinning, spreading, painting, or electrospinning. In the case of a solvent solution, the solvent may be removed to leave a conductive polymer layer including the electrically conductive organic polymer. If the conductive polymer is desired to be included within the internal bulk of the GDL, the GDL may be soaked in a solution of the conductive polymer to at least partially fill the pores of the GDL, and then the solvent may be removed to leave the conductive polymer dispersed within the interior.

In still other embodiments an already formed conductive polymer layer (e.g., a separate film, sheet, or other layer including an electrically conductive organic polymer) may be applied to one or more surfaces of an MEA (e.g., one or more major surfaces of an anode GDL, a surface of an anode catalyst, etc.). The preformed film, sheet, or other layer of conductive polymer may be contacted and coupled with the surface (e.g., a major surface of an anode GDL). Various techniques for bonding, attaching, adhering, or otherwise coupling the layer with the surface are possible. A few examples of such techniques include, but are not limited to, lamination, application of heat, application of pressure, application of an adhesive (e.g., a monomer of an electrically conductive polymer), and combinations of such approaches.

Having been generally described, the following examples are given as particular example embodiments of the invention, to illustrate some of the properties and further demonstrate the practical advantages thereof, and to further allow one skilled in the art to utilize the invention. It is understood that these examples are to be construed as illustrative rather than limiting.

Example 1

Forming a Conductive Polymer Layer

Layers of poly(3,4-ethylenedioxythiophene) (PEDOT) were formed on GDLs with varying amounts of polymer using an electrochemical deposition method. PEDOT is an example of an electrically conductive organic polymer. 3,4-ethylenedioxythiophene (EDOT), sodium dodecylsulfate (SDS) and lithium perchlorate ($LiClO_4$) were obtained from Sigma-Aldrich. 35BC (SGL carbon) fuel cell gas diffusion layers (GDLs) were obtained from Ion Power, Inc., of New Castle, Del. The GDLs had a rigid carbon paper support side and a microporous layer side that provides a relatively flat surface for catalyst support. The 35BC GDL material was cut into 8 cm diameter circles (with an approximately 0.5 cm×3 cm tab to make the electrical connection) to perform electrochemical polymerization. Potentiostatic polymerizations were performed in a one-compartment three-electrode cell containing an aqueous solution of 80 mM of 3,4-ethylenedioxythiophene (EDOT) and 140 mM of sodium dodecylsulfate (SDS), with 100 mM lithium perchlorate ($LiClO_4$) as the supporting electrolyte. Electrochemical polymerizations were performed under ambient conditions using a PAR 273 potentiostat, controlled with CORRWARE® brand software for electrochemical data acquisition, available from Scribner Associates Inc., of Southern Pines, N.C. The 35BC GDL material was immersed into the solution, with the rigid carbon paper support side facing a counter electrode, and served as the working electrode (approximately 50 cm² surface area). The counter electrode was a platinum wire/mesh flag placed in plane with the 35BC GDL working electrode at a distance of approximately 1.0 in while the reference was an aqueous Ag/Ag+ couple. Polymerization was performed at a constant potential (0.85V), with the thickness controlled by monitoring the coulombs. Scanning electron microscope (SEM) analysis revealed that the PEDOT polymerized as conformal layers or coatings on the carbon fibers and on the microporous layer both within the bulk interior and on the outside surfaces of the GDLs. Longer deposition times led to thicker films and higher levels of filling of the pores of the GDLs. Some GDLs were modified to have on the order of 7 mg/cm² PEDOT. An adaptation of the configuration of this example is contemplated that could electropolymerize material through one side instead of both, for example, by including a non-conductive backing on the other side. The films were then electrochemically reduced at 0V for about 120 seconds. The modified GDLs were rinsed well with water and dried in air. The GDLs were stored and handled in air.

Example 2

Measuring Methanol Permeabilities of Gas Diffusion Layers with and without Conductive Polymer Layers Methanol permeabilities were determined for GDLs with and without PEDOT layers formed thereon. The PEDOT layers were formed on the GDLs as described in Example 1. The methanol permeabilities were determined using a membrane-separated diffusion cell generally as described in the article Hickner, M. A.; Fujimoto, C. H.; Cornelius, C. J. *Polymer* 2006, 47, 4238-4244. Each GDL separated 20 mL of water and 20 mL of 1M methanol solution. The rigid carbon paper side faced the methanol solution. A high-performance liquid chromatography pump was used to circulate the water solution at 7 mL/min through a Waters 2414 refractive index detector to determine the methanol concentration. Measurements were taken at 60° C. The permeability, the product of the diffusion coefficient (D) and the solubility (H), was calculated from the following equations:

$$-DH \cdot \chi \cdot t = \ln\left(\frac{c_{SR} - c_{WR}}{c_{SR}^o - c_{WR}^o}\right) \quad (1)$$

$$\chi = \frac{A}{l}\left(\frac{1}{V_L} + \frac{1}{V_R}\right) \quad (2)$$

where $c_{SR}$ and $c_{WR}$ respectively are the concentration of solute in the solute-rich and water-rich compartments at time t, $c^o_{SR}$ and $c^o_{WR}$ respectively are the initial concentrations in the solute-rich and water-rich compartments at time zero, A is the active area of transport, l is the thickness of the substrate, $V_L$ is the volume of the solute-rich cell, and $V_R$ the volume of the water-rich cell at time t=0. The volumes of $V_L$ and $V_R$ are assumed to remain constant throughout the course of the experiment. A plot of ln $[(c_{SR}-c_{WR})/(c^o_{SR}-c^o_{WR})]$ versus time yields a straight line with slope $-D*H*\chi$. Once $\chi$ is determined by measuring the geometry of the cell, the permeability can be calculated.

Figure 4:
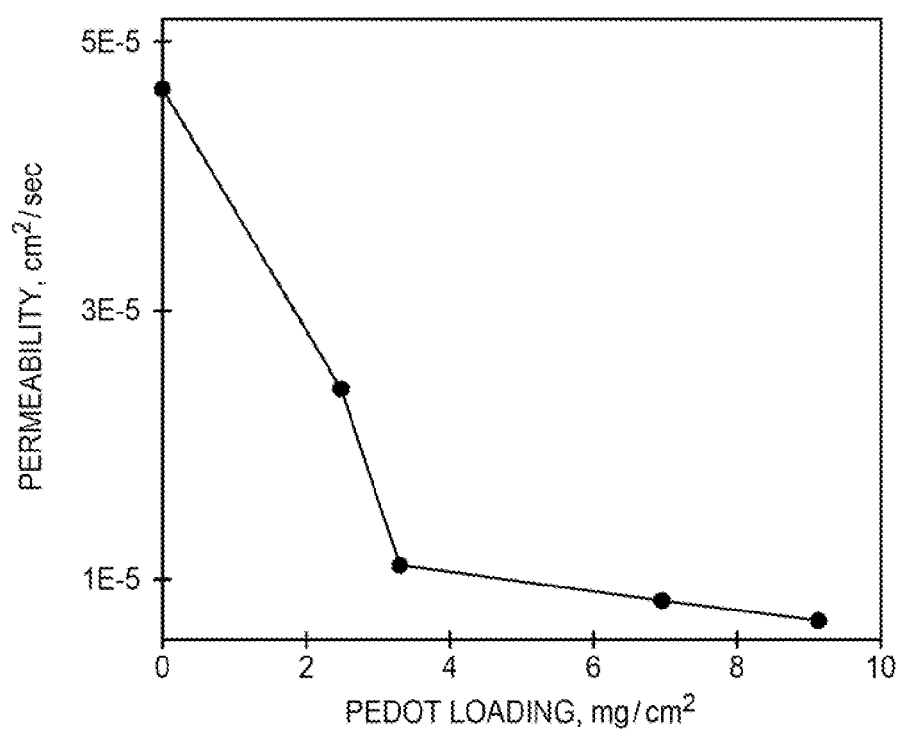
FIG. 4 shows measured methanol permeabilities of gas diffusion layers with and without conductive polymer layers as a function of conductive polymer mass loading.

FIG. 4 shows measured methanol permeabilities at 60° C. of bare SGL 35BC GDLs and SGL 35BC GDLs having PEDOT layers as a function of PEDOT mass loading. These methanol permeability experiments demonstrate that the presence of the PEDOT mass transfer limiting layers decreased the methanol permeabilities of the GDLs. The methanol permeabilities decreased rapidly with PEDOT loadings less than 4 mg/cm². At PEDOT loadings above approximately 4 mg/cm², the rate of the decrease in methanol permeabilities with increasing PEDOT loading decreased. The higher loadings of PEDOT result in methanol permeabilities an order of magnitude less than those measured for the bare GDL without the mass transfer limiting conductive polymer layers.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other (e.g., they may be coupled by one or more intervening elements). For example, an anode GDL and an anode catalyst may be coupled through an intervening conductive polymer layer.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, materials, devices, and operations have been shown in block diagram form or without detail in order to avoid obscuring the understanding of the description.

It will also be appreciated, by one skilled in the art, that modifications may be made to the embodiments disclosed herein, such as, for example, to the sizes, shapes, configurations, forms, functions, materials, and manner of operation, and assembly and use, of the components of the embodiments. All equivalent relationships to those illustrated in the drawings and described in the specification are encompassed within embodiments of the invention.

For simplicity and clarity of illustration, elements illustrated in the figures have not necessarily been drawn to scale. For example, the dimensions of some of the elements are exaggerated relative to other elements for clarity. Further, where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. An apparatus consisting essentially of comprising: an anode catalyst layer, the anode catalyst layer operable to catalyze a reaction involving a fuel reactant; an anode electrode comprising an anode input to receive one or more reactants; an anode gas diffusion layer coupled to and disposed between the anode catalyst layer and the anode electrode, the anode gas diffusion layer including a porous electrically conductive material, the porous electrically conductive material operable to allow the fuel reactant to transfer through the anode gas diffusion layer to reach the anode catalyst layer and operable to conduct electrons associated with the reaction through the anode gas diffusion layer; and an electrically conductive polymer material disposed between the anode catalyst layer and the anode electrode, the electrically conductive polymer material operable to limit transfer of the fuel reactant to the anode catalyst layer;
   wherein the electrically conductive polymer material comprises at least one electrical conductivity enhancing additive selected from carbon nanotubes, fullerenes, graphenes, carbon particles, carbon nanoparticles, carbon nanomaterials, metal particles, metal nanoparticles, metal nanomaterials, conductive particles, conductive nanoparticles, and combinations thereof.

2. The apparatus of claim 1, wherein the electrically conductive polymer material comprises a substantially nonporous layer coupled adjacent to the anode gas diffusion layer.

3. The apparatus of claim 1, wherein the electrically conductive polymer material comprises a layer coupled between the anode gas diffusion layer and the anode catalyst layer.

4. The apparatus of claim 1, wherein the electrically conductive polymer material is disposed between and coupled to the anode gas diffusion layer and the anode catalyst layer.

5. The apparatus of claim 1, wherein the electrically conductive polymer material is disposed between and coupled to the anode gas diffusion layer and the anode electrode.

6. The apparatus of claim 1, wherein the electrically conductive polymer material is included within the anode gas diffusion layer.

7. The apparatus of claim 1, wherein the electrically conductive polymer material comprises at least one electrically conductive polymer selected from a group consisting of thiophene polymers, polythiophenes, 3-alkyl thiophene polymers, 3,4-ethyl enedioxythiophene polymers, poly(3,4-ethylenedioxythiophenes) (PEDOTs), benzothiazole polymers, benzothiadiazole polymers, phenylene sulfide polymers, poly(p-phenylene sulfides), pyrole polymers, polypyrroles, carbazole polymers, polycarbazoles, indole polymers, polyindoles, azepine polymers, polyazepines, analine polymers, polyanilines, acetylene polymers, polyacetylenes, fluorene polymers, polyfluorenes, phenylene polymers, polyphenylenes, pyrene polymers, polypyrenes, azuelene polymers, polyazulenes, naphthalene polymers, polynaphthalenes, phenylene vinylene polymers, poly(p-phenylene vinylenes), derivatives thereof, and combinations thereof.

8. The apparatus of claim 1, wherein the electrically conductive polymer material comprises an electrically conductive organic polymer having one of acidic functional groups and basic functional groups.

9. The apparatus of claim 1, wherein the electrically conductive polymer material comprises at least one electrical conductivity enhancing additive that is a dopant operable to increase the conductivity of the electrically conductive polymer material.

10. The apparatus of claim 1, wherein the electrically conductive polymer material is operable to limit the transfer of the fuel reactant to the anode catalyst layer to a rate that is at least five times less than a rate that the fuel reactant is able to transfer across the anode gas diffusion layer.

11. The apparatus of claim 1, wherein the electrically conductive polymer material is operable to limit the transfer of the fuel reactant into the anode catalyst layer to not more than 30% greater than the consumption rate of the fuel reactant.

12. The apparatus of claim 1, wherein the fuel reactant comprises one of an alkanol having from one to ten carbons and an alkane having from one to ten carbons.

13. The apparatus of claim 1, wherein the porous electrically conductive material of the anode gas diffusion layer comprises at least one of a porous electrically conductive carbon material, a carbon cloth, a carbon paper, a carbon foam, a porous electrically conductive graphite material, a graphite cloth, a graphite paper, and a graphite foam.

14. An apparatus consisting essentially of an anode comprising: an input to receive a fuel reactant; a gas diffusion layer coupled with the input; an anode catalyst coupled with the gas diffusion layer, the an anode catalyst operable to catalyze a reaction involving the fuel reactant; and an electrically conductive polymer layer disposed between the input and the an anode catalyst, the electrically conductive polymer layer operable to limit transfer of the fuel reactant into the an anode catalyst; a cathode; and a polymer electrolyte membrane coupled between the anode and the cathode;
   wherein the electrically conductive polymer layer comprises at least one electrical conductivity enhancing additive selected from carbon nanotubes, fullerenes, graphenes, carbon particles, carbon nanoparticles, carbon nanomaterials, metal particles, metal nanoparticles, metal nanomaterials, conductive particles, conductive nanoparticles, and combinations thereof.

15. The apparatus of claim 14, wherein the electrically conductive polymer layer comprises a substantially nonporous electrically conductive polymer layer coupled adjacent to the gas diffusion layer.

16. The apparatus of claim 14, wherein the electrically conductive polymer layer is coupled between the gas diffusion layer and the catalyst, and further comprising a second electrically conductive polymer layer coupled between the input and the gas diffusion layer.

17. The apparatus of claim 14, wherein the electrically conductive polymer layer is included within the gas diffusion layer.

18. The apparatus of claim 14, wherein the electrically conductive polymer layer is operable to limit the transfer of the fuel reactant into the catalyst to a rate that is at least five times less than a rate that the fuel reactant is able to transfer across the gas diffusion layer.

19. The apparatus of claim 14, wherein the electrically conductive polymer layer is operable to limit the transfer of the fuel reactant into the catalyst to a rate that is equal to, substantially equal to, or not substantially greater than, a given consumption rate of the fuel reactant at the catalyst.

20. The apparatus of claim 14, wherein the polymer electrolyte membrane comprises one of a proton exchange membrane and an alkaline exchange membrane.

21. The apparatus of claim 14, wherein the fuel reactant comprises one of an alkanol having from one to six carbons and an alkane having from one to six carbons.

* * * * *